May 12, 1925.  1,537,481
J. D. McCUTCHEON
CUTTING AND WELDING TORCH
Filed Jan. 20, 1923   2 Sheets-Sheet 1
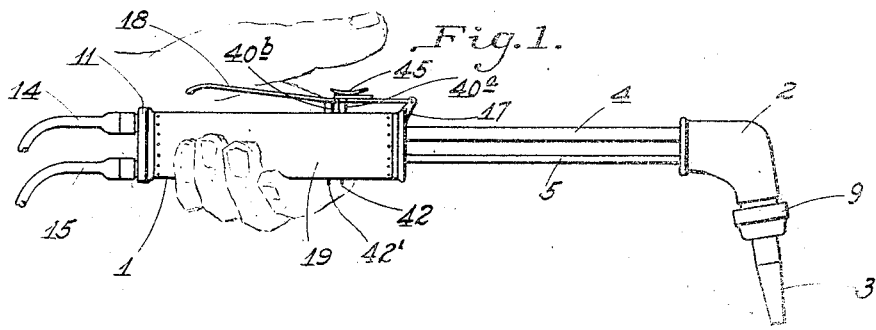
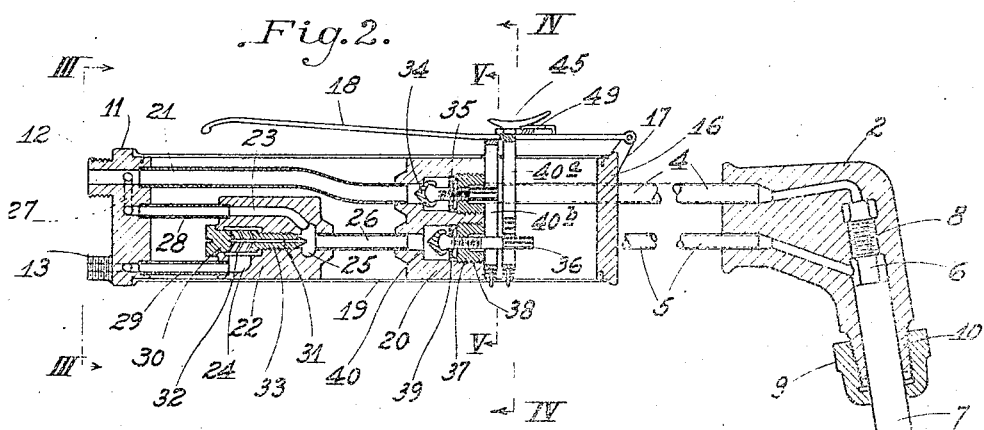
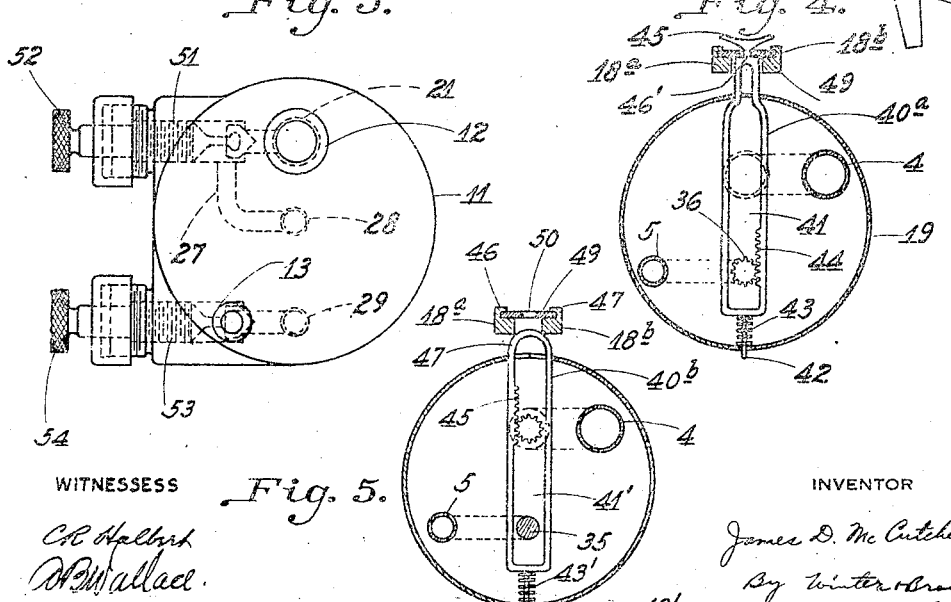
WITNESSES
INVENTOR

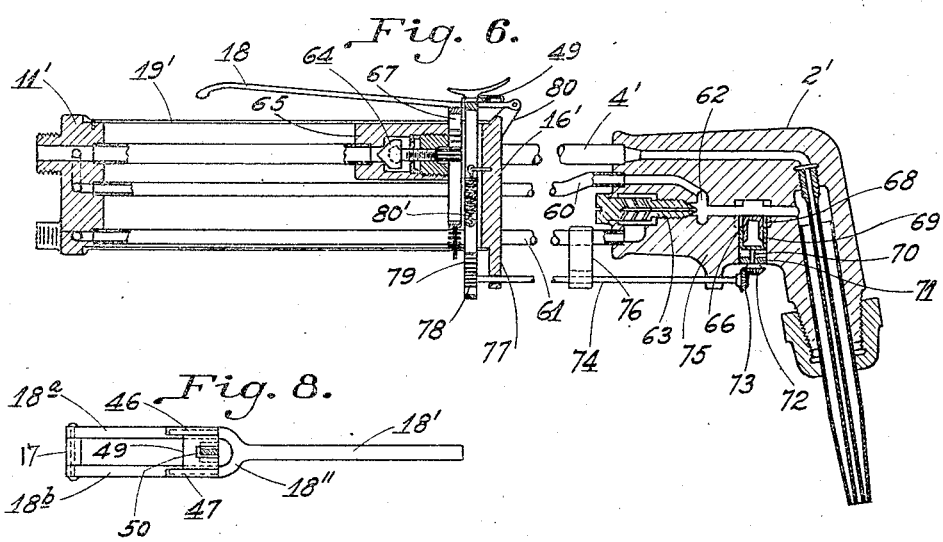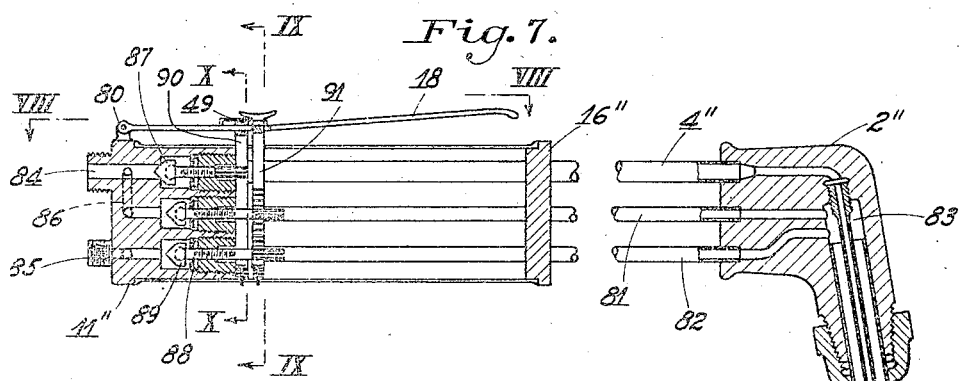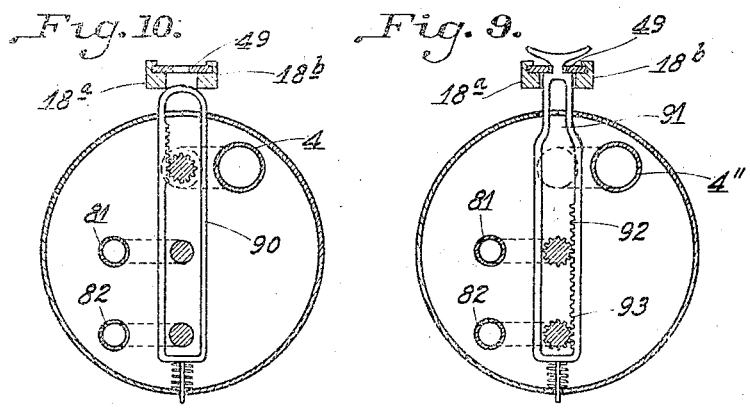

Patented May 12, 1925.

1,537,481

UNITED STATES PATENT OFFICE.

JAMES D. McCUTCHEON, OF PITTSBURGH, PENNSYLVANIA.

CUTTING AND WELDING TORCH.

Application filed January 20, 1923. Serial No. 613,874.

*To all whom it may concern:*

Be it known that I, JAMES D. MCCUTCHEON, a citizen of the United States, and a resident of Pittsburgh, in the county of Allegheny and State of Pennsylvania, have invented a new and useful Improvement in Cutting and Welding Torches, of which the following is a specification.

This invention relates to torches, and particularly to a cutting and welding torch adapted to deliver separate or independent jets of a cutting gas and a heating gas, in which the heating gases are employed for raising the material acted upon to the necessary temperature to enable the cutting operation to be performed.

It is an object of the invention to provide a cutting torch which is simple, compact and durable, which can be manufactured at a nominal cost, which will not easily get out of order, which is convenient to manipulate, and which is highly efficient in operation.

With torches of the character referred to, it is highly desirable to be able to reduce or control the flow of heating gases during the time the flow of cutting gases is supplied, to diminish the flow of heating gases simultaneously with the increase in the supply of the cutting gases, or in some instances to vary the flow of the respective gases independently of each other. It is a special object of the invention to provide a device which will enable the operator to readily control both the heating and cutting jets at will, either to effect a reduction in the size of the heating jet while simultaneously increasing the size of the cutting jet, the discontinuance of the heating jet during the cutting operation, or the independent control of both jets to vary their respective intensities.

It is a further special object to provide a torch which is neat in appearance, in which the several control means are conveniently located so as not to render the device cumbersome and awkward to use and at the same time will readily respond to the initial actuating element which itself is disposed adjacent the handle of the device so as to be easily manipulated by the hand which grips the torch.

It is still a further special object to provide a torch in which the cutting and heating gases may be selectively controlled either simultaneously or independently of each other by an actuating device at all times within the easy reach of and capable of being actuated by the hand of the operator grasping the torch.

These and other objects of the invention will more fully appear when taken in conjunction with the following description and the appended claims.

In the drawings Fig. 1 is a side elevation illustrating one embodiment of the invention; Fig. 2 a longitudinal section, on an enlarged scale, of the device illustrated in Fig. 1; Fig. 3 an end elevation looking in the direction of the arrows III—III of Fig. 2; Fig. 4 a transverse sectional view taken on the line IV—IV of Fig. 2; Fig. 5 a similar view taken on the line V—V of Fig. 2; Fig. 6 a longitudinal section illustrating a modified form of the invention; Fig. 7 a similar view of a still further modified form of the invention; Fig. 8 a detailed view of the hand-actuated control lever taken on the line VIII—VIII of Fig. 7; and Figs. 9 and 10 transverse sectional views taken on the lines IX—IX and X—X, respectively, of Fig. 7.

Referring to the embodiment illustrated in Figs. 1 to 5, the torch comprises the handle portion designated generally by the reference numeral 1, and the head 2 provided with the nozzle 3 attached thereto which is adapted to deliver the jets of cutting and heating gases, the head being connected to the handle by means of the pipes 4 and 5, thus forming a unitary structure. The pipe 4 serves to deliver the cutting gases to the nozzle, while pipe 5 delivers the heating gases thereto. The head illustrated is of well known construction, being provided with suitable passages for conducting the cutting gases to the central tube 6 and for delivering the heating gases to the annular space formed between the exterior of the tube 6 and the interior of the outer tube 7 of the nozzle, the inner extremity of the tube 6 being threaded into the body of the head as shown at 8, and the outer tube 7 being held in position by the head nut 9 threaded upon the reduced portion 10, all in accordance with well known constructions.

The handle portion 1 comprises a base casting 11 at one end provided with the nipples 12 and 13 to which are attached the respective tubes 14 and 15 conveying the cutting and fuel gases from their sources of supply, the cutting gas being supplied through the tube 14, while the fuel gas enters the torch by means of the tube 15. The end of the handle portion opposite the base casting 11 consists of a closure plate 16 provided at its upper portion with the ear or lug 17 to which the control lever 18 is pivoted. Extending between the base casting and the closure plate are the grips 19 which are attached at their opposite ends in any suitable way to the base casting and closure plate, forming a cylindrical casing therebetween which not only serves as a convenient means for grasping the torch, but also for housing portions of the control apparatus to be presently described.

Located within the interior of the handle-casing and intermediate the base casting and closure plate 16 is a valve block 20 with passages extending therethrough, to the exit end of one of which the pipe 4 is connected, while the pipe 5 is similarly connected to the other. A pipe 21 connects at one end with the bore of the nipple 12 and at its opposite end with the inlet of the passage from which the pipe 4 leads for the purpose of supplying the cutting gas. Interposed between the valve block 20 and the base casting 11 is a second block 22 provided with the passages 23 and 24, the passages leading to a common chamber 25 adjacent one end of the block. The chamber 25 is connected by the pipe 26 with the inlet side of the passage of the valve block 20 from which the pipe 5 extends. The end of the passage 23 adjacent the base casting is connected to a duct or branch passage 27, in communication with the bore of the nipple 12, by means of the pipe 28, while the passage 24 is connected to a duct, leading from the bore of the nipple 13 by a similar pipe 29. Fitting within a suitably formed recess and intersecting the passage 24 is a plug 30 provided with a longitudinal duct 31 and a plurality of radially extending branch ducts 32. This plug is threaded into the body of the block as indicated at 33, and serves as a means for limiting the flow of the fuel gases from the tube 15 to the pipe 26, and in addition serves as a means for preventing back-firing beyond the point at which it is located, in a well known manner.

The flow of cutting gas from the pipe 21 to pipe 4, and the flow of the heating gas from pipe 26 to pipe 5 is controlled by suitably constructed valves interposed in the passages of the valve block 20 connecting the said pairs of pipes. These valves are of identical construction and consist of a conical swivel point or head 34 swiveled to the stem 35, the intermediate portion of the stem being threaded while its outer extremity is in the form of a spur pinion 36. The threaded portion of the stem is adapted to cooperate with correspondingly internally threaded plugs 37 which are in turn externally threaded into recesses in the block 20 as indicated at 38. Suitable washers 39 are interposed between the plugs 37 and the head of the valve, and the swivel points are adapted to cooperate with suitably formed seats indicated at 40. It is thus seen that with the construction described rotation of the stems 40 within the plugs 37 will cause longitudinal movement of the valve so as to seat and unseat swivel heads in an obvious manner.

In order to rotate the valve stems, specially formed racks are employed. The rack $40^a$ employed for actuating the valve interposed in the supply line for the heating gases is illustrated in Fig. 4, while that employed for actuating the valve interposed in the supply line for the cutting gases is shown at $40^b$ in Fig. 5. These racks are somewhat similar in construction, being provided with elongated slots 41, 41', respectively, and having projecting from their closed lower ends the fingers 42, 42' which extend through guide openings formed in the grip members of the handle, a coil spring 43, 43' being interposed between the body of the rack and the grip, the spring surrounding the said finger and normally urging the racks in an upward direction. Rack teeth 44 are formed at one side of the slot 41 throughout a portion of its length which are adapted to mesh with the spur pinion 36 formed on the end of the valve stem. Both racks project upwardly through suitable guide openings in the grips 19, disposed diametrically opposite the holes through which the fingers 42, 42' project. The rack illustrated in Fig. 4 is provided at its upper extremity with a thumb piece 45 which is connected to the body of the rack by means of the reduced portion 46', while the rack illustrated in Fig. 5 is merely closed at its upper end 47 by joining the two limbs forming the opposite sides of the slot 41'. It is to be noted, however, that the rack teeth 45 of rack $40^b$ are disposed at the opposite side of the slot 41' to that upon which the teeth 44 are located, whereby reciprocation of the racks will result in rotating the valve stems in opposite directions when moved either upwardly or downwardly.

Both of the racks are adapted to be reciprocated by the control lever 18. This lever is illustrated in detail in Fig. 8, and consists of the handle portion 18' which is divided at a point 18'' midway of its length so as to form the separate limbs $18^a$, $18^b$, the extremities of which are pivoted to the ear or lug 17. The upper closed end 47 of the rack $40^b$ is adapted to bridge the space between the limbs 18ª, 18ᵇ, and contact the same so as to be forced downwardly whenever the handle 18′ is depressed. The limb 18ª is provided with an overhanging lip 46, and the limb 18ᵇ is similarly provided with an oppositely disposed overhanging lip 47, the two cooperating to form guiding grooves in which a plate 49 is adapted to slide, this plate being provided at one side with an open ended slot 50 for receiving the reduced portion 46 of the rack 40ª so as to lock the said rack to the lever when the plate is in the position shown in Figs. 2 and 4, causing the rack to move in response to the movements of the control lever 18. Whenever the plate 49 is moved to a position to withdraw the portion 46′ from the slot 50, the upper end of the rack 40ª projects freely upwardly between the limbs of the control lever, and will therefore not respond to movements of the control lever 18 until purposely connected therewith.

The quantity of gas passing through the branch passage 27 is determined by a cut-off valve indicated at 51, this valve being located at one side of the casting 11 and is adapted to be actuated by the knurled head 52. The general construction of this cut-off valve corresponds to that of the control valve previously described, with the exception of the provision of a knurled head instead of the pinion at its outer end, as clearly shown in Fig. 3. This cut-off valve is adapted to regulate the flow of the gas fed from the cutting gas supply line to the pipe 23, for a purpose to be subsequently more fully set forth. Likewise, the supply line for the fuel gases fed to the pipe 29 is provided with a similarly constructed cut-off valve indicated at 53 equipped with the knurled head 54, the valve 53 being located also at one side of the base casting 11.

The gas most commonly used for the cutting gas is oxygen, which as previously described is supplied through the tube 14, while any fuel gas may be used, such as acetylene, the fuel gas being supplied through the tube 15. A portion of the fuel gas is mixed with a portion of the oxygen, taken from the cutting gas supply line, within the chamber 25 to form the heating gases which are delivered through the pipes 26 and 5 to the nozzle. The oxygen mixed with the fuel gas passes through the branch passage 27, pipe 28, and the duct 23, its flow therethrough being controlled by manipulation of the valve 51, and being delivered to the chamber 25 at a reduced pressure.

The valves 51 and 53 being set to furnish the necessary flow of gases to form the heating gas, and with the plate 49 moved to a position to lock the rack 40ª to the control lever 18, the heating gases are permitted to flow to the nozzle to produce the heating jet in a well known manner, the control interposed between the pipes 26 and 5 being open. This jet is employed for bringing the metal to be cut or severed to the desired temperature, none of the cutting gas being supplied through the pipe 4 during this time due to the fact that the control valve 34 in the supply line for the cutting gases is closed. After the material to be operated upon has been brought to the desired temperature, by pressing the control lever 18 downwardly, the control valve 34 in the heating gas line is forced to move toward its closed position due to the rotation of its guiding stem by means of the rack 40ᵇ and its cooperating pinion. During the closure of the said valve, the control valve in the cutting gas supply line is forced to move to its open position due to the rotation of its stem in the opposite direction, consequently permitting the flow of the cutting gas to the nozzle. It is thus seen that with the parts in the position just described, the supply of heating gases may be diminished or entirely cut off simultaneously with the increase in the supply of cutting gases to the nozzle.

In case it is desirable to actuate the control valves in the two supply lines independently of each other, it is merely necessary to move the plate 49 out of locking engagement with the rack 40ª, in which instance movement of the control lever 18 will result in merely controlling the valve in the cutting gas line, while the flow of heating gases may be controlled by actuation of the thumb piece 45.

In the modified form illustrated in Fig. 6, the handle portion is made up of the base casting 11′, the closure plate 16′ and the interposed grip portions 19′, the handle portion being connected to the head portion 2′ by means of the pipes 4′, 60 and 61. The nozzle in this modification corresponds to that in the form previously described, but instead of delivering fuel gas and oxygen in mixed condition to the head, the low pressure oxygen is supplied through the pipe 60 and the fuel gas through the pipe 61 and suitably formed passages in the head to the mixing chamber 62, the fuel gases being forced to flow through the plug 63, corresponding in construction to the plug 30 in the previously described form, fitting within a recess in the head. The valve for controlling the flow of high pressure oxygen for cutting purposes is indicated at 64 which is located within the valve plug 65, while the control valve for the heating gases is indicated generally at 66. The valve 64 corresponds in construction to valve 34, previously described, and is adapted to be actuated by means of the rack 67, corresponding to rack 40ᵇ.

The valve 66 is of special construction and consists of a non-rotatable plug 68 exteriorly threaded adjacent its outer end for cooperation with the interiorly threaded inner end of a cup shaped member 69 provided with the projection 70 fitting within a central aperture of a closure plug 71 fitted within the open end of the recess in which the valve is disposed. The outer end of the stem 70 is provided with a beveled pinion 72 which is adapted to mesh with a pinion 73 attached to one end of a shaft 74 suitably journalled for rotary movement in a lug 75 formed on the head, a bracket 76 depending from the pipe 61, and an apertured lug 77 formed at one side of the closure plate 16'. Fixed to the end of the shaft 74 opposite the pinion 73 is a spur pinion 78 which is adapted to mesh with the rack teeth 79 formed upon the rack 80, corresponding in construction with the rack 40ª, shown in Fig. 4, with the exception that the lower end thereof extends below the handle, in the manner clearly shown in Fig. 6, said rack being urged upwardly by the extension spring 80'.

The form illustrated in Fig. 6 operates as follows: The depression of the control lever 18 actuates the control valve for the cutting gases in the same manner as in the embodiment first described, and the rack 80 may be either connected or disconnected from the said lever as in said embodiment. Reciprocation of the rack 80 causes rotation of the pinion 78, the shaft 74, the pinions 73 and 72, resulting in rotation of the cup shaped member 69. Rotation of the member 69 due to its threaded connection with the plug valve 68 causes the valve to be reciprocated for the purpose of regulating the flow of gases through the passage which it intersects, consequently controlling the flow of heating gases to the nozzle. By connecting the control lever 18 to the rack 80 both the cutting gases and the heating gases may be simultaneously controlled, while by merely disconnecting the rack 80 from the control lever, the flow of the two gases may be independently governed.

It will therefore be seen that the primary distinctions between the constructions shown in Figs. 1 to 5 and that illustrated in Fig. 6, is the mixing of the fuel gas and low pressure oxygen within the head of the torch, and the disposition of the control valve for the heating gases in the head thus reducing the dangers of back-firing therebeyond.

In the modification illustrated in Figs. 7 to 10, the control lever is pivoted to the base casting 11" as at 80, instead of to the closure plate 16", and all of the control valves are located in the base casting itself, instead of in separate blocks or in the head 2". In this form the handle portion is connected to the head by means of three supply pipes, 4" for supplying the high pressure cutting oxygen and the pipes 81 and 82, which connect with suitable passages in the head 2" and discharge into the common chamber 83 for delivering the heating gases to the nozzle. The supply of oxygen is fed to the base casting through the nipple 84, while the fuel gas is supplied through the nipple 85. The base casting is provided with three sets of passages, a main passage for supplying the cutting oxygen and which is connected to the inner end of the pipe 4, a branch passage 86 leading therefrom and delivering into the pipe 81, and a third passage establishing communication between the nipple 85 and the pipe 82. The flow through these three passages is controlled by the respective valves 87, 88 and 89, all corresponding in construction to the control valves 34 in the embodiment first described. The valve 87 is adapted to be actuated upon reciprocation of the rack 90, while the valves 88 and 89 are adapted to be actuated in unison by means of the rack 91. The rack 90 corresponds in construction to the rack 40ᵇ while the rack 91 corresponds to rack 40ª with the exception that instead of being provided with but a single set of rack teeth, rack 91 is equipped with two sets of rack teeth indicated at 92 and 93, as clearly shown in Fig. 9, for meshing with the pinions of the respective valves 88 and 89.

The operation of this modification will be obvious in view of that pointed out in connection with the other two forms. Depression of the control lever 18 results in the actuation of the control valve 87 governing the flow of cutting oxygen, while actuation of the rack 91 results in moving both valves 88 and 89, consequently governing the flow of the low pressure oxygen traversing the passage 86 and the flow of fuel gases to the pipe 82 from the nipple 85. Control of both valves 88 and 89 in unison, and in the same sense, has the ultimate effect of governing the supply of heating gases delivered to the chamber 83 and to the nozzle. The same locking means is employed in this embodiment as in the previously described forms for permitting either simultaneous or independent actuation of the racks 90 and 91 and the respective valves associated therewith.

It is thus seen that the invention provides a compact, neat and durable construction, one which possesses a neat appearance and in which the several control mechanisms are encased, one which is highly efficient in operation and easily manipulated by the hand of the operator which grasps the torch, and one in which the flow of cutting and heating gases may be controlled either simultaneously or independently at the will of the operator. It is obvious that with the use of a torch of the kind described that the flow of the heating gases during the cutting operation may be entirely cut off or reduced to a minimum thereby effecting a decided saving in the quantity of heating gases consumed.

I claim:

1. A cutting torch comprising a nozzle adapted to deliver cutting and heating jets, means for supplying a gas to form the cutting jet, means for supplying a gas to form the heating jet, and means for increasing the flow of cutting gas while simultaneously decreasing the flow of heating gas from a single controlling element.

2. A cutting torch comprising a head adapted to deliver cutting and heating jets, three supply lines delivering gases to said head, one of said lines delivering gas to form the cutting jet, said two remaining lines delivering gases to form the heating jet, a valve interposed in each of said lines, and a common controlling element operatively connected to all of said valves, movement of said controlling element in one direction serving to open the valve in the line for supplying the cutting gas and to close both the said valves in the lines for supplying the heating gases.

3. A cutting torch comprising a nozzle adapted to deliver cutting and heating jets, a supply line delivering gas to form the cutting jet, a second supply line delivering gas to form the heating jet, valves interposed in each of said gas supply lines for directly controlling the said cutting and heating jets, and means for simultaneously opening one of said valves while closing the other of said valves.

4. A cutting torch comprising a nozzle adapted to deliver cutting and heating jets, a supply line for delivering gas to form the cutting jet, a second supply line delivering gas to form the heating jet, valves interposed in each of said supply lines for controlling the cutting and heating gases without altering the character thereof, and means for selectively actuating said valves either in unison or independently of each other.

5. A cutting torch comprising a handle, a head provided with a delivery nozzle adapted to form cutting and heating jets, pipes operatively connecting the handle and head as a unitary structure, one of said pipes delivering gas to form the cutting jet, and another of said pipes delivering gas to form the heating jet, valves controlling the respective gas supplies to each of said jets without altering the character thereof, and means for selectively moving said valves either in unison or independently of each other, the actuating element for the last named means being located adjacent the said handle.

6. A cutting torch comprising a nozzle adapted to deliver cutting and heating jets, a supply line delivering gas to form the cutting jet, a second supply line delivering gas to form the heating jet, valves interposed in each of said gas supply lines, separate actuating members operatively connected to each of said valves, a control member adapted to move both said actuating members, and means for selectively connecting and disconnecting the control member from one of said actuating members.

7. A cutting torch comprising a nozzle adapted to deliver cutting and heating jets, a supply line delivering gas to form the cutting jet, a second supply line delivering gas to form the heating jet, valves interposed in each of said gas supply lines, separate rack bars operatively associated with each of said valves, a control lever for reciprocating both said racks, and a catch for selectively locking and unlocking the said lever to one of said racks.

8. A cutting torch comprising a nozzle adapted to deliver cutting and heating jets, a supply line delivering gas to form the cutting jet, a second supply line delivering gas to form the heating jet, valves interposed in each of said gas supply lines, separate rack bars operatively associated with each of said valves, springs urging said racks to move in one direction, a control lever abutting one of the racks to move the same in the opposite direction, and a catch for operatively connecting and disconnecting the remaining rack from the said lever.

9. A cutting torch comprising a head adapted to deliver cutting and heating jets, a base casting at the rear of the torch provided with three passageways, a pipe communicating with each of said passageways for conducting gas therefrom to the said head, one of said pipes supplying gas for the cutting jet, the remaining pipes supplying gases for the heating jet, a valve interposed in each of said passageways, and a common control element for all of said valves, movement of said control element in one direction serving to open the valve in the pipe supplying the cutting jet and to close the said remaining valves.

10. A cutting torch comprising a head adapted to deliver cutting and heating jets, a base casting at the rear of the torch provided with three passageways, each of said passageways having a valve seat interposed therein, a valve cooperating with each of said valve seats having its stem extending longitudinally of the torch, a pipe connecting each of said passageways to the said head, one of said pipes conducting gas to supply the cutting jet, a control lever common to all of said valves, operative connections between the said lever and the stems of the valves, movement of said lever in one direction serving to open the valve for controlling the flow of the cutting gas and to close the remaining valves.

In testimony whereof, I sign my name.

JAMES D. McCUTCHEON.

Witness:
  EDWIN O. JOHNS.